(12) United States Patent
Whelan et al.

(10) Patent No.: US 8,121,172 B1
(45) Date of Patent: Feb. 21, 2012

(54) CHIRPED SURFACE ACOUSTIC WAVE (SAW) CORRELATOR/EXPANDER

(75) Inventors: Steve Whelan, Santa Clara, CA (US); Paul Beard, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 12/641,179

(22) Filed: Dec. 17, 2009

Related U.S. Application Data

(63) Continuation of application No. 11/089,630, filed on Mar. 23, 2005, now Pat. No. 7,653,118.

(60) Provisional application No. 60/558,173, filed on Mar. 26, 2004.

(51) Int. Cl.
*H04B 1/00* (2006.01)
(52) U.S. Cl. .......... 375/139; 375/141; 375/146
(58) Field of Classification Search .......... 375/139, 375/141, 146, 142, 143; 455/334, 339, 74; 333/193

See application file for complete search history.

(56) References Cited

U.S. PATENT DOCUMENTS

| | | | |
|---|---|---|---|
| 6,047,306 A * | 4/2000 | Hikita et al. | 708/815 |
| 6,104,260 A | 8/2000 | Yamada et al. | |
| 6,570,462 B2 * | 5/2003 | Edmonson et al. | 333/17.3 |
| 6,791,236 B1 | 9/2004 | Abramov | |
| 6,856,214 B2 | 2/2005 | Jian et al. | |
| 6,970,496 B1 * | 11/2005 | Ben-Bassat et al. | 375/141 |
| 7,292,822 B2 | 11/2007 | Edmonson et al. | |
| 7,653,118 B1 | 1/2010 | Whelan et al. | |
| 2003/0231107 A1 * | 12/2003 | Edmonson et al. | 340/10.42 |
| 2004/0108917 A1 * | 6/2004 | Jian et al. | 333/193 |
| 2005/0059357 A1 * | 3/2005 | Edmonson et al. | 455/74 |
| 2005/0136880 A1 | 6/2005 | Subasic et al. | |

OTHER PUBLICATIONS

USPTO Notice of Allowance for U.S. Appl. No. 11/089,630 dated Nov. 24, 2009; 3 pages.
USPTO Notice of Allowance for U.S. Appl. No. 11/089,630 dated Sep. 8, 2009; 7 pages.
USPTO Non-Final Rejection for U.S. Appl. No. 11/089,630 dated Apr. 20, 2009; 17 pages.
USPTO Non-Final Rejection for U.S. Appl. No. 11/089,630 dated Oct. 31, 2008; 16 pages.
USPTO Advisory Action for U.S. Appl. No. 11/089,630 dated Sep. 8, 2008; 3 pages.
USPTO Final Rejection for U.S. Appl. No. 11/089,630 dated Jun. 25, 2008; 14 pages.
USPTO Non-Final Rejection for U.S. Appl. No. 11/089,630 dated Dec. 26, 2007; 18 pages.
Springer et al., A Robust Ultra Broadband Wireless Communication System Using Saw Chiped Delay Lines; Institute for Communications and Information Engineering, Austria; Microwave Symposium Digest, May 1998 IEEE MTT-S International, vol. 2, pp. 491-494; 4 pages.

* cited by examiner

*Primary Examiner* — Kabir A Timory
*Assistant Examiner* — Helene Tayong

(57) ABSTRACT

A surface acoustic wave (SAW) expander based transmitter and correlator based receiver comprises SAW devices that perform expander or correlator functions based on the types of signals inputted to the SAW devices. The SAW devices incorporate chirp with adaptive interference and programmable coding capabilities. The SAW devices and method of operating the devices allow the implementation of very low power radios that overcome problems with temperature drift, lithography constraints and interference and jamming suffered by prior art implementations.

11 Claims, 8 Drawing Sheets

CHIRPED SURFACE ACOUSTIC WAVE (SAW) CORRELATOR/EXPANDER

BACKGROUND OF THE INVENTION

1. Related Application Data

This application is a continuation of U.S. application Ser. No. 11/089,630 filed on Mar. 23, 2005 which claims priority from U.S. Provisional Application No. 60/558,173 filed Mar. 26, 2004.

2. Field of the Invention

The invention relates generally to electronic circuits and, more particularly, to circuits for wireless communication.

3. Description of the Related Art

Conventional radios have been extensively implemented using superhetrodyne and direct conversion architectures constructed from circuit blocks such as mixers, amplifiers, and RF filters. There are many chipsets on the market using various process technologies, but they are usually active circuits requiring a power source. One alternate approach is to construct a radio using a passive surface acoustic wave (SAW) expander and correlator.

FIGS. 1 and 2 show a representative transmitter 10 and receiver 20, respectively, using the SAW approach. The main disadvantage of SAW correlator and expander implementations in the prior art is that they are implemented at an intermediate frequency (IF) to allow a local oscillator (LO) (12, 22) to compensate for inherent temperature drift and tolerances of the SAW device (11, 21) as a closed loop system. Although the SAW device (11, 21) itself is passive in this implementation, other active circuits are still required at the front end and for the LO and up/down converters, as shown. Without such compensation, the correlation performance and sidelobe levels become unacceptable over a practical temperature range, making the radio performance unacceptable. Historically, correlators/expanders have not been implemented directly at the radio frequency (RF) front end because of the temperature drift problem described above, but also because of problems with device to device manufacturing variance and difficulties with small feature size lithography required for operation above about 800 MHz.

Thus, it would be desirable to have a correlator/expander implemented at the RF front end if the issues of temperature variation and tight lithographic technology could be resolved.

SUMMARY OF THE INVENTION

In one embodiment of the invention, a communications system for transmitting and receiving signals comprises a baseband controller for coding a transmit signal and decoding a receive signal, a switch network coupled to the baseband controller, and surface acoustic wave (SAW) devices coupled to the switching network. On the transmitter side, a reference oscillator provides a plurality of reference signal pulses to the switch network. The SAW devices perform expander or correlator functions based on types of signals inputted.

In another embodiment of the invention, a surface acoustic wave (SAW) expander based transmitter comprises a baseband controller for coding an input signal and providing an output signal to a switching network, a reference oscillator for providing a plurality of reference signal pulses to the switching network, first and second chirp expanders coupled to the switching network for forming first and second chirped signals, and a combiner circuit for combining the first and second chirped signals into a transmit signal.

In another embodiment of the invention, a surface acoustic wave (SAW) correlator based receiver comprises: a circuit for receiving a signal, a splitter for splitting the received signal into first and second signals, first and second chirp correlators for compressing the first and second signals and forming first and second correlated pulses, and a baseband controller for decoding the correlated first and second pulses and forming a receive signal.

In yet another embodiment of the invention, a method of transmitting and receiving signals in a communications system comprises providing control signals to a switching network, and operating surface acoustic wave (SAW) devices coupled to the switching network. At a transmitter side, the method comprises generating a plurality of reference signal pulses and providing the pulses to the switching network. The SAW devices are operated at a radio frequency (RF) front end of the communications system. Active compensation schemes are not used.

DETAILED DESCRIPTION OF THE EMBODIMENTS

Figure 1:
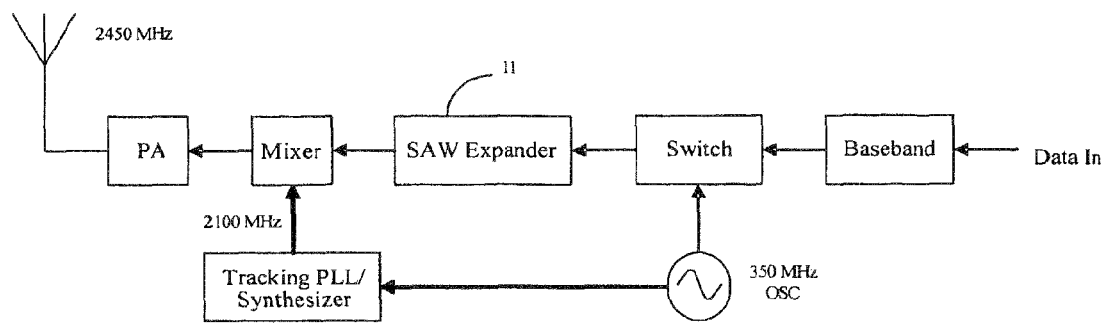
FIG. 1 is a conventional surface acoustic wave (SAW) expander based transmitter.
Figure 2:
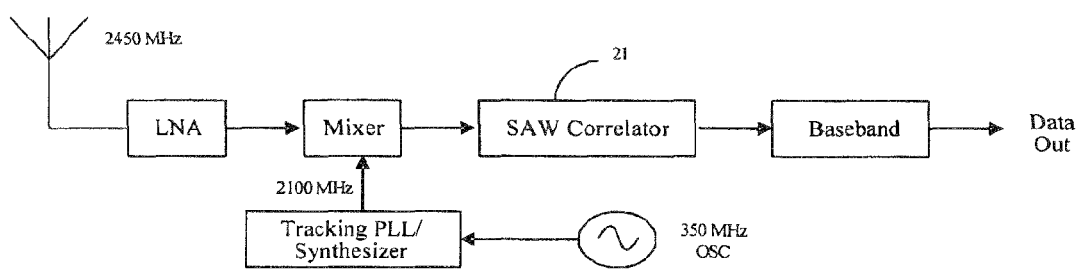
FIG. 2 is a conventional SAW correlator based receiver.
Figure 3:
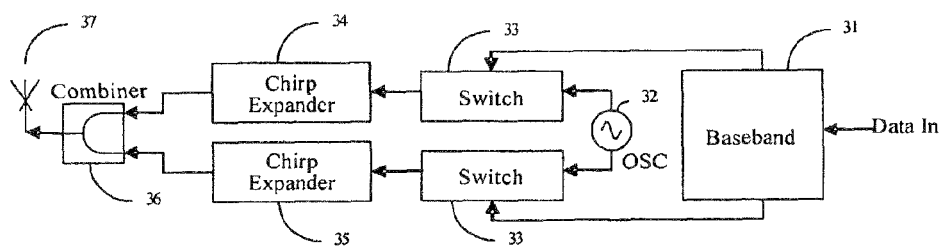
FIG. 3 is an improved SAW expander based transmitter.

An embodiment of an improved surface acoustic wave (SAW) expander based transmitter 30 is shown in FIG. 3. The expander based transmitter 30 comprises a baseband section 31, an oscillator 32, two switches 33, two chirp expanders 34, 35 (of opposite chirp direction) and a combiner 36. Data is suitably coded in the baseband section 31 and its output controls the switches 33. Data is imparted to the transmitter 30 by creating a train of pulses from the reference oscillator 32. The pulses are fed to the chirp expanders 34, 35 to create an up or down ramping frequency pulse. The expanders 34, 35 are fabricated on a surface acoustic wave (SAW) substrate with novel interdigital transducers (IDTs). One IDT is used to implement programmable coding for multiple-access and the other is used to implement the chirp. After passing through the expanders 34, 35, the chirped signals are then combined in combiner 36 to an antenna 37 for transmission.

Figure 4:
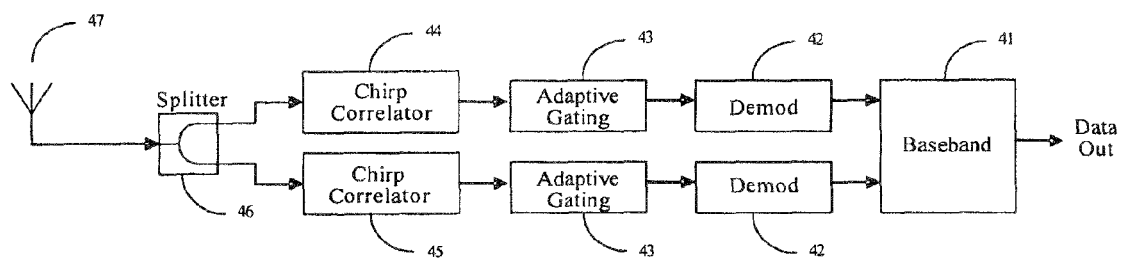
FIG. 4 is an improved SAW correlator based receiver.

Similarly, an improved SAW correlator-based receiver 40 is shown in FIG. 4. The receiver 40 comprises a splitter 46, two chirp correlators 44, 45 (of opposite chirp direction), adaptive starting gating blocks 43, demodulation circuits 42, and a baseband section 41. Following the antenna 47, the received signal is split into two signals. The chirp correlators 44, 45 will then compress the signals according to the characteristics of the chirp design. Signals matching the direction and characteristics of the chirp correlators 44, 45 will result in a correlated output. All other signals will be uncorrelated. The chirp correlators 44, 45 are implemented using a SAW device with IDTs designed for coding and chirp functions, similar to the SAW expanders 34, 35. The chirped transducer in the correlator is broken into several sub-bands to allow adaptive interference mitigation. This is simply implemented by breaking the IDT bus bar into sections. The sub-bands (sections) can be combined or deleted to mitigate interference or jamming. This function is depicted by the adaptive gating block 43 in FIG. 4. Following this block, the signals can be demodulated in demodulator 42 using a simple threshold detector. The detected output can then be decoded by the baseband section 41.

Together, FIGS. 3 and 4 show an improved system implementation of a chirp SAW correlator and expander in a dual channel receiver and transmitter. In the improved system implementation, the SAW devices are located directly at the RF front end instead of at an intermediate frequency (IF). In addition, no local oscillator (LO) or up/down converter is required. Furthermore, the SAW expander based receiver 40 requires no reference oscillator at all.

Figure 5:
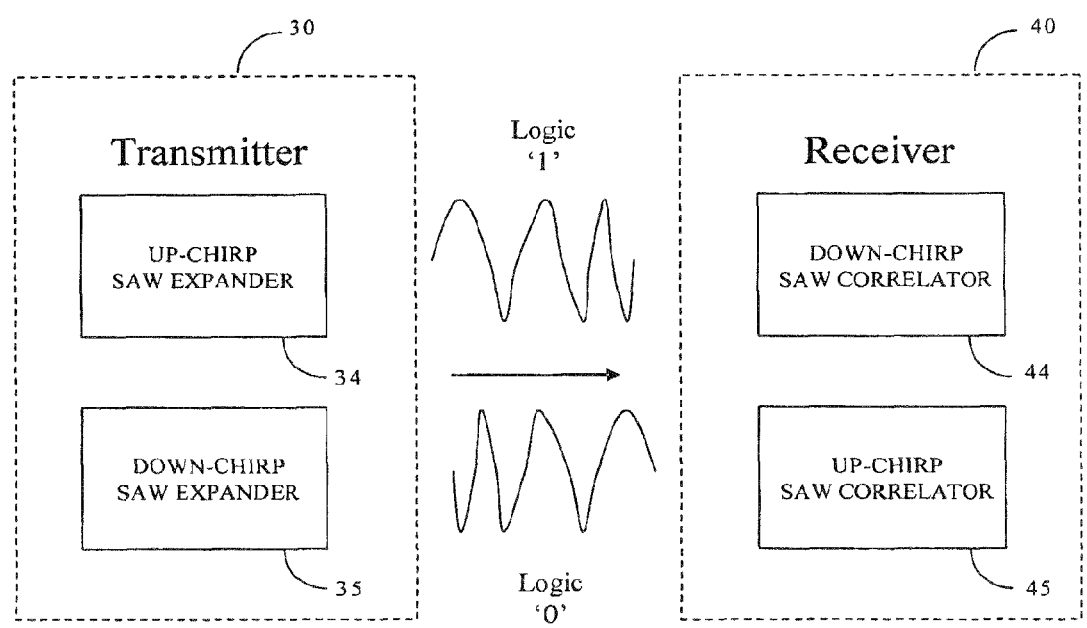
FIG. 5 is a block diagram of chirp SAW correlator/expander functions necessary for a radio implementation.

FIG. 5 shows a simplified block diagram of the chirped SAW correlator/expander functions necessary to implement the transmitter 30 and the receiver 40 in FIGS. 3 and 4. The transmitter 30 comprises two expanders 34, 35, one with up-chirp (increasing frequency) and one with down-chirp (decreasing frequency), representing a logical 1 or 0, respectively. In an alternate embodiment, the up-chirp may represent logic '0' and the down-chirp may represent logic '1'. Similarly, the receiver 40 comprises two correlators 44, 45 performing the correlation function. The receiver SAW devices are paired with those in the transmitter, such that the receiver has the inverse time response of the transmitter.

Advantages of the improved architecture include the ability of chirp to compensate for temperature drift and process variances by using chirp to sweep over a band of frequencies sufficient to overcome the expected temperature drift and manufacturing tolerances of the SAW device. This eliminates the need for active compensation schemes such as down conversion and tracking LOs used in conventional non-dispersive architectures. Consequently, the correlator/expander can be implemented directly at the RF front end, resulting in very low power consumption. In addition, chirp improves the impedance match of the devices, thereby improving insertion loss.

Another unique advantage of the improved architecture includes the ability to combine phase coding and chirp IDTs. A SAW correlator/expander comprises an input and output IDT. The combination of one coded transducer and one chirped transducer to achieve a coded chirped signal in a single device has the advantage of size reduction and lower insertion loss compared with two devices implementing these functions separately. The finger length of the proposed IDTs can be adjusted using a suitable apodization to modify the envelope characteristic for maximum sidelobe suppression. Apodization is a well-known window function applied in communication theory. In the case of a SAW device, the window function can be implemented by adjusting the finger length across the IDT according to a suitable window (apodization) function.

Figure 6:
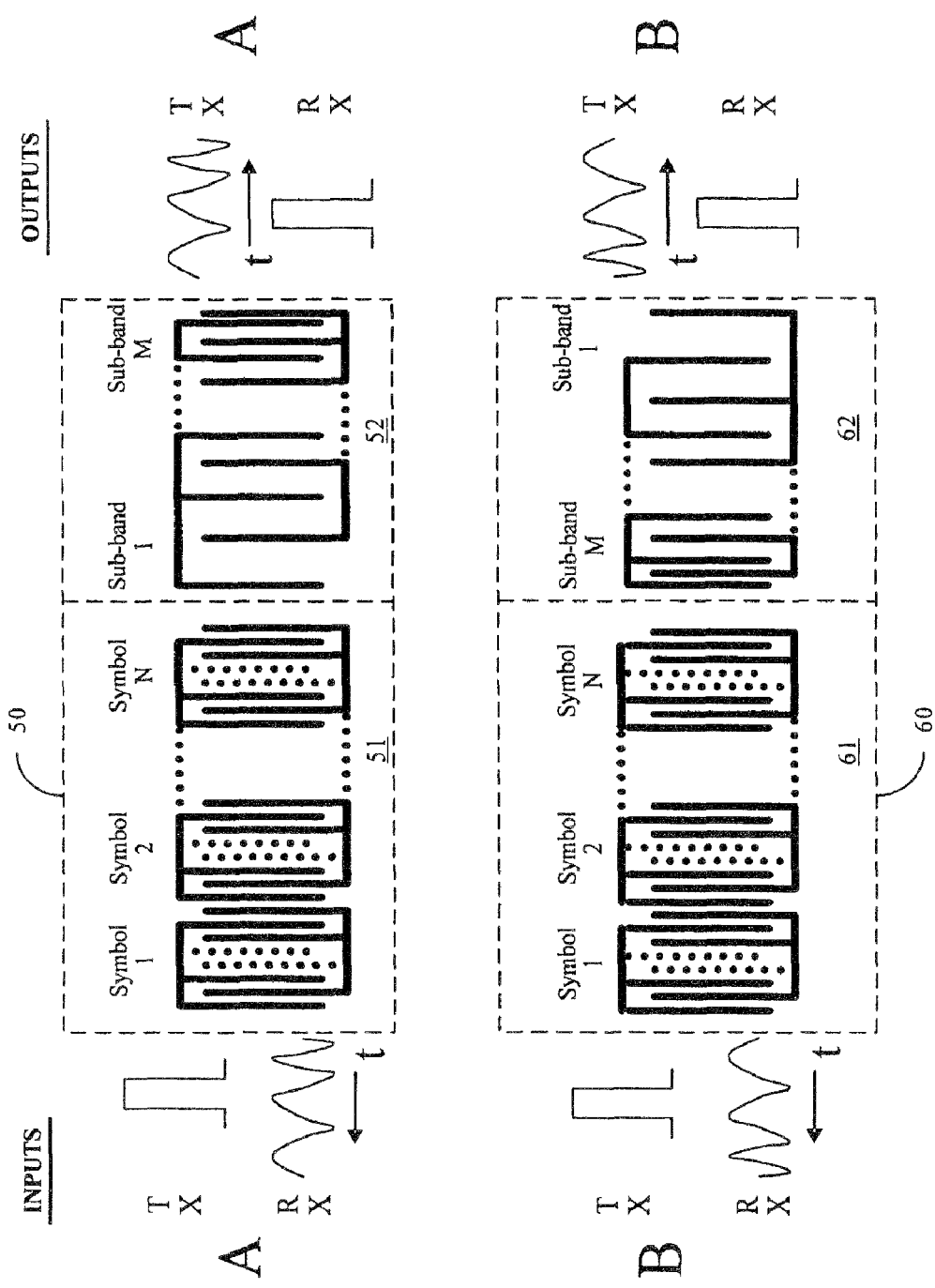
FIG. 6 is a simplified schematic of SAW expander and correlator showing input and output signal transforms.

FIG. 6 shows two SAW devices 50, 60 and depicts the physical implementation of the correlators 44, 45 of receiver 40 and expanders 34, 35 of transmitter 30. The input IDTs 51, 61 are phase coded with N number of symbols to allow multiple access coding (CDMA). The output IDTs 52, 62 are chirped in symmetrically opposite directions and broken into M sub-bands, which can be summed or deleted for interference/jamming mitigation. The two SAW devices 50, 60 depicted in FIG. 6 are capable of performing all four of the correlator and expander functions outlined in FIG. 5. The function of each SAW device depends on the type of signal that is presented to its input terminals (on the left). If a pulse is presented to the input terminals of either SAW device 50, 60, the device will perform as an expander and a chirped signal will appear at the output terminals. In this case, the SAW devices 50 and 60 will have up and down chirps, respectively. Similarly, if upchirp and downchirp signals are presented to the inputs of the SAW devices 50 and 60, respectively, the outputs will be correlated pulses. That is, the device performs the function of a correlator. Any other signal combinations will result in uncorrelated outputs.

Figure 7:
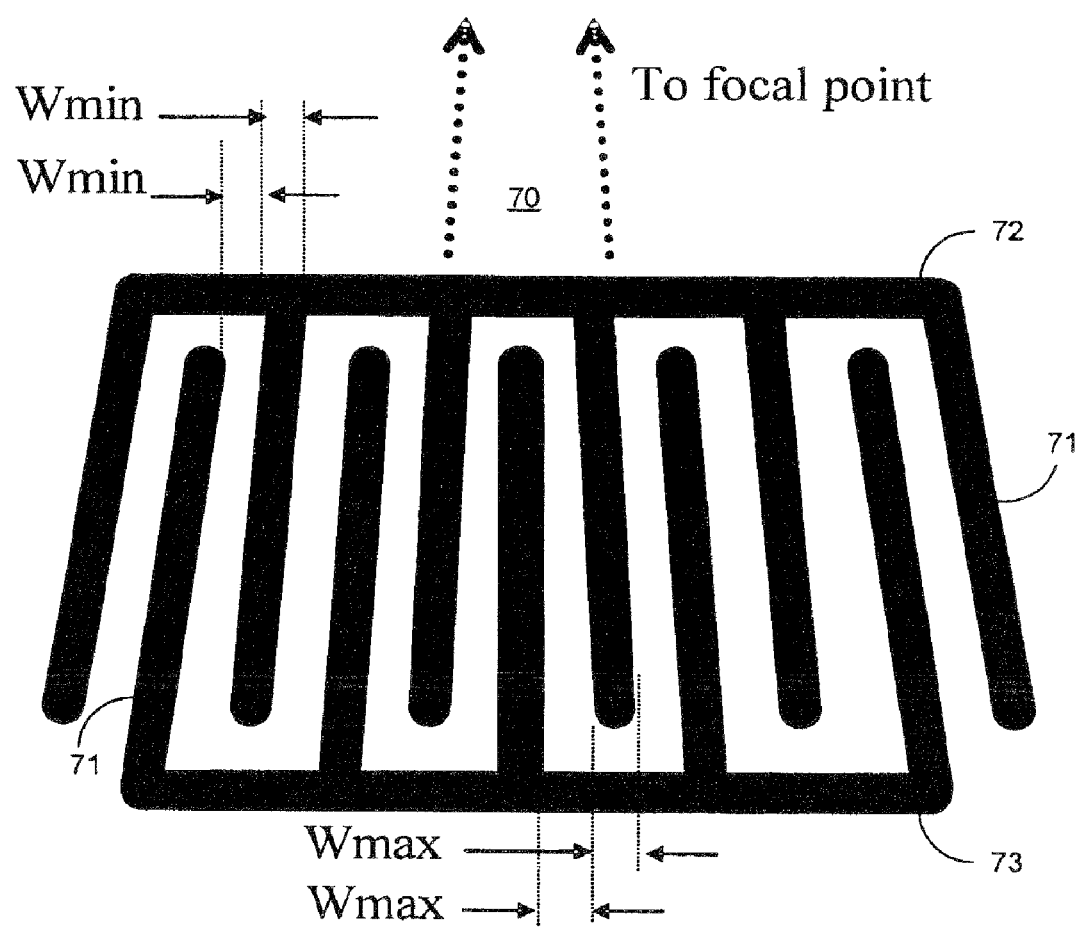
FIG. 7 is a diagram of slanted IDT.

FIG. 7 shows a further unique feature of the improved architecture, which uses slanted fingers 71 in the phase coded IDT 70 to improve bandwidth. The 4 dB bandwidth of an IDT is approximately 1/Np (where No is the number of finger pairs). Therefore, for phase coded IDTs with constant finger spacing, the longer the code, the narrower the bandwidth of the IDT. This dependency can be overcome by using slanted fingers. Slanted IDTs have been demonstrated with maximum slant angles of up to 7 degrees for standard (non-coded) IDTs, but have not been applied to coded IDTs. The coding of the IDT 70 is achieved by the periodicity of finger connections to the bus bars 72, 73. The upper 72 and lower 73 bus bars of each symbol (group of fingers) are exactly out of phase, so that driving the bus bars with the appropriate polarity will create a phase inversion in the signal representing coded symbols.

Figure 8:
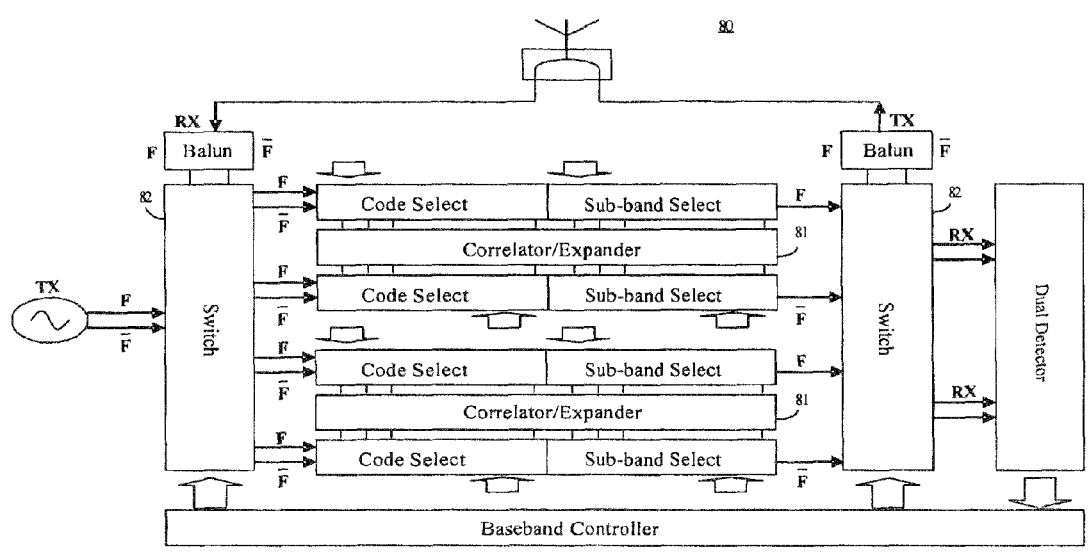
FIG. 8 is a SAW based radio schematic transmitting up and down chirps.

FIG. 8 shows a preferred embodiment of a complete transmitter/receiver radio architecture 80. In particular, the architecture shows the unique use of the SAW correlator/expander 81 for both transmit and receive functions, depending on the signal that is switched to the input of the device 80. Note that F and F in FIG. 8 represent differential signal inputs. The switch network 82 includes the switching necessary to implement the programmable symbol coding and adaptive interference mitigations functions by controlling the signal connections to the IDT bus bars.

Figure 9:
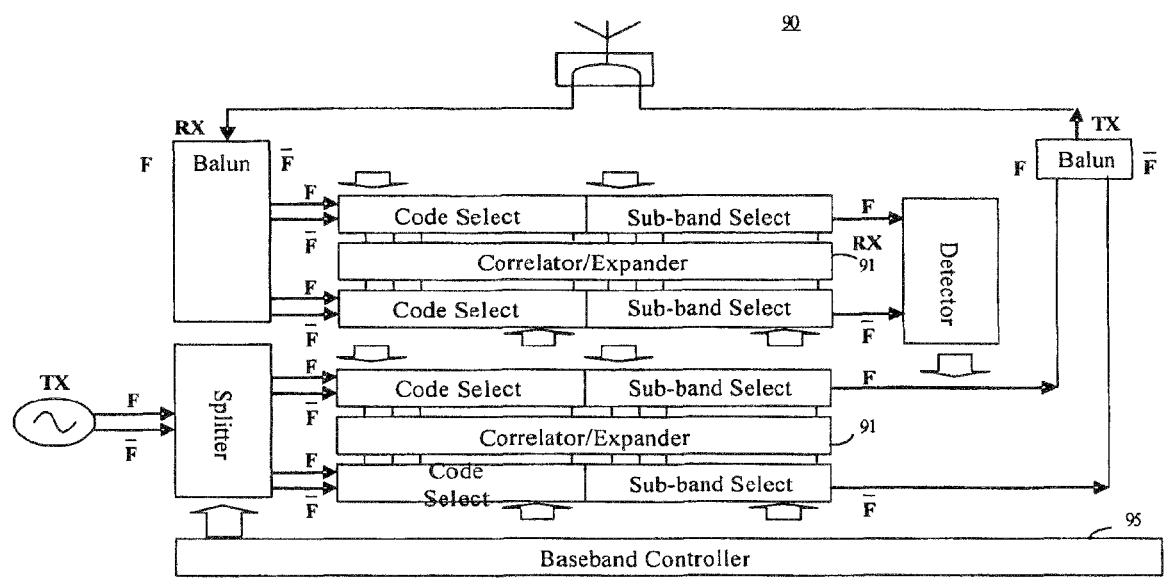
FIG. 9 is a simplified SAW based radio schematic transmitting unidirectional chirps.

FIG. 9 shows an alternate simplified embodiment of the improved architecture. The radio architecture of FIG. 9 employs unidirectional chirp only, to simplify the switching networks. Either up or down chirp may be implemented. The architecture uses each SAW device for either transmit or receive, but not both (unlike FIG. 8). Thus, the overall data throughput for FIG. 8 will be halved, all other things being equal, and an alternate signaling methodology would be required since the implementation of FIG. 9 has only downchirps (or upchirps). Any standard signal protocol (for example, on-off keying (OOK)) may be used to signify a '1' or '0'. FIG. 9 may implement bi-direction chirps by duplicating the entire architecture with opposite chirp. A common baseband controller 95 may be used.

A further enhancement of the improved architecture is operation of the SAW devices at a harmonic frequency. Harmonic operation has the advantage of reducing lithographic demands, especially for high operating frequencies (for example, those greater than 800 MHz). In a preferred embodiment, the improved architecture operates at the third harmonic, but the use of other harmonics may also be practical. Harmonic operation also improves the impedance match of the devices (in addition to that from chirp), thereby improving insertion loss. Harmonic operation for SAW correlators/expanders in radio transmitter and receiver applications reduces lithographic demands and improves insertion loss and is unique.

Figure 10:
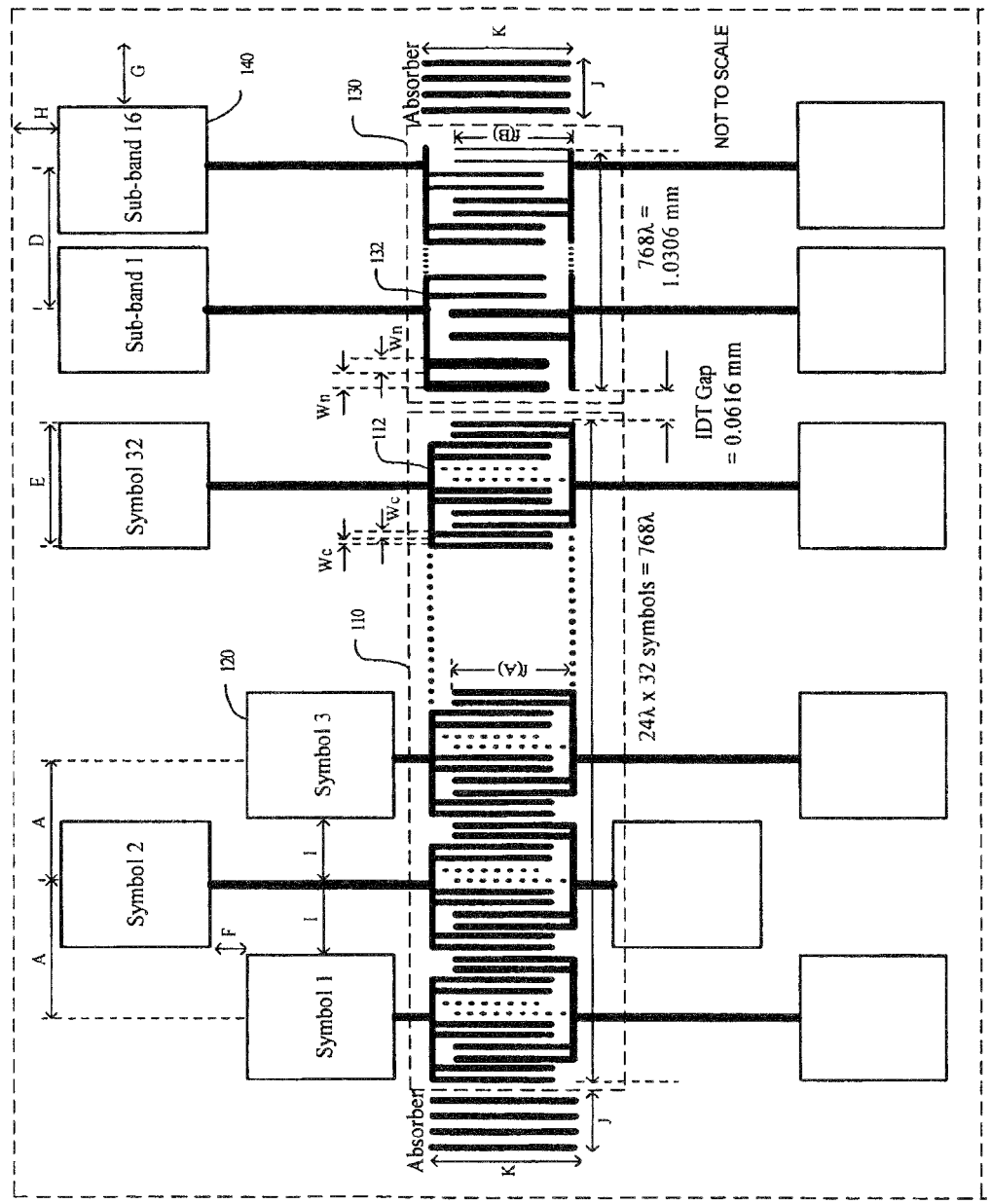
FIG. 10 is a conceptual layout of SAW correlator/expander (fundamental dimensions).

FIG. 10 is a conceptual layout of a preferred embodiment of the SAW expander/correlator 100 along with the preferred dimensions. FIG. 10 provides a more detailed representation of the SAW device 50 in FIG. 6. The layout and dimensions (and related discussion) of the embodiment are referenced to a fundamental center frequency of 2441.75 MHz. This can be easily transformed into a third harmonic design as the final step by simply omitting every second and third split electrode pair and tripling the width/spacing of the remaining fingers.

The design of the SAW device 60 in FIG. 6 is very similar to the expander/correlator 100 shown in FIG. 10, except with opposite chirp. All other aspects of the device are identical and, therefore, not repeated here. The substrate is assumed to be X112° rotY-LiTaO$_3$, with v=3276.6 m/s, though other piezoelectric substrates may be used in alternate embodiments.

Referring back to FIG. 10, the input IDT 110 is split into 32 symbols to allow phase coding. In the embodiment shown in FIG. 10, a 32 symbol code is used. In another embodiment, N symbol code may be used, where N is an integer. The bus bar 112 is split between symbols 120 to permit the polarity to be arbitrarily set (programmed) with an external switching network. Each symbol 120 is chosen to be 24λ long. Ideally, a smaller symbol length would be preferred since the design is severely pad limited. However, 24λ is 32.2 microns long, which is approximately the smallest practical staggered pad pitch supported by modern wire bonding equipment. The symbol size must be exactly divisible by 3λ to allow scaling to the third harmonic as the final step, if desired.

The input IDT 110 uses a split finger design (4 fingers per λ) to minimize reflections. The line/spacing dimension (Wc) is λ/8 or 0.1677 microns at the center frequency (2441.75 MHz), which is beyond current high volume manufacturing limits. As mentioned above, this may be mitigated in the final layout by omitting every second and third tap and tripling the width/spacing of the remaining taps to produce a third harmonic design.

The center frequency wavelength is given by λ=v/f=1.342 microns, where v=3276.6 m/s for X112° rotY-LiTaO$_3$ and f=2441.75 MHz. Therefore, the nominal length of the input IDT 110=32 symbols×24λ long=1.0306 mm.

Unfortunately, a regularly spaced input IDT cannot be used. The large number of taps limits the bandwidth of the IDT to approximately 1/Np (where Np is the number of finger pairs; each finger is implemented as a split finger in this case). This is the same as the total number of wavelengths and gives an approximate bandwidth of 1/768 or about 0.13%, much too narrow to pass 60 MHz (or 2.5%) desired for this embodiment.

A method to increase the inherent bandwidth of an IDT is to use slanted fingers, as shown in FIG. 7. The fingers 71 are slanted to a common focal point, so that there is a constant minimum width (Wmin) at the top of the IDT fingers and a constant maximum width (Wmax) at the bottom end. These two widths are then set to the upper and lower frequencies, respectively. In this way, the fingers 71 are resonant at some point along their length across the desired bandwidth.

The width/spacing of the slanted IDT is given by the equations:

$$W\text{max}=\lambda(\text{min})/8=v/8f(\text{max})$$

and $$W\text{min}=\lambda(\text{max})/8=v/8f(\text{min}),$$

such that the minimum width/spacing Wmin=0.1657 microns and the maximum width/spacing Wmax=0.1698 microns at the fundamental frequency in FIG. 7.

The slanted IDT 70 in FIG. 7 trades the effective aperture for bandwidth since the IDT is resonant only over a small part of the IDT finger 71. This effectively increases insertion loss. However, the reduced capacitive loading should improve the impedance match of the device to somewhat offset this.

Referring back to FIG. 10, the output IDTs 130 of the two SAW devices used for this system are a mirror image of each other, one with upchirp and one with downchirp. The finger spacing, Wn, on the output increases or decreases linearly, depending on the direction of chirp. The bus bars 132 on the output transducers 130 for this embodiment are broken into 16 sub-bands (equivalent to 3.75 MHz) to facilitate adaptive interference cancellation. The sub-bands 140 can be summed or deleted in response to the jamming environment. As noted earlier, the four correlator/expander functions can be accomplished using just two SAW devices because the SAW correlators used for the receiver can also be used to transmit (expand) the opposite channel in the transmitter. However, in the case of transmission, the sub-bands of the chirped IDT are all combined into one in the embodiments of FIGS. 3, 8, and 9. In an alternate embodiment, the sub-bands may be summed or deleted in order to avoid transmitting in sub-bands known to include interference or jammers.

The length of the dispersive IDT sets the length of the frequency ramp (chirp length), whereas the delay is set by the distance between the centers of the input and output IDTs. For convenience, we choose the length of the input and output IDTs to be the same (i.e., 768λ). This number of wavelengths is convenient for the output IDT 130, since the number is readily divisible into 16 sub-bands and also scales with an integer relationship to the third harmonic. It can be shown that the total length of the chirp IDT is the same as for a non-chirp input IDT (1.0306 mm), corresponding to a chirp time of 0.3145 microseconds.

The data rate is given by the reciprocal of the delay. For a 3 Mb/s data rate, a delay of ⅓ microsecond is required, which approximately corresponds to a distance:

$$(v*t)=1.0922 \text{ mm},$$

while the total delay path length is given by:

$$\text{Total delay path length}=\tfrac{1}{2}(\text{Input } IDT \text{ length}+\text{Output } IDT \text{ length})+IDT \text{ Gap length}.$$

Therefore, for a ⅓ microsecond delay and equal IDT lengths (1.0306 mm), the IDT gap is: 1.0922−½(1.0306+1.0306) =0.0616 mm.

The selection of apodization and IDT aperture size is adjustable depending on the desired specifications. In this embodiment, the combined IDT response has a response equivalent to a Hamming function with 42 dB minimum sidelobe suppression.

Due to the high operating frequency, care must be taken with the physical layout to minimize RF losses, parasitics, and undesired coupling. The output traces and bond pads should be kept as short as possible to minimize the series inductance. Mutual coupling between adjacent I/Os should be minimized. In general, good RF practice should be exercised in the overall layout methodology to minimize the parasitic effects of the I/O. Special attention must be paid to parasitic coupling between bond pads and to traces passing between bond pads.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A surface acoustic wave (SAW) correlator-based receiver comprising:
    a splitter coupled to an antenna and to a first chirp correlator and a second chirp correlator, the splitter configured to split a signal received by the antenna into a first signal and a second signal;
    the first chirp correlator coupled to the splitter and configured to compress the first signal and the second chirp correlator coupled to the splitter and configured to compress the second signal, wherein the first and second chirp correlators are configured to be paired with a first and second chirp expander of a SAW expander-based transmitter, respectively;
    a plurality of adaptive starting gate blocks coupled to the first and second chirp correlators and configured to mitigate interference in the first and second signals; and
    a plurality of demodulation circuits coupled to the plurality of adaptive starting gate blocks and configured to demodulate the first and second signals to produce a detected output.

2. The SAW correlator-based receiver of claim 1, wherein the first and second chirp correlators comprise a SAW substrate with interdigital transducers (IDTs) configured to perform coding and chirp functions.

3. A chirped surface acoustic wave (SAW) communication system comprising:
    a SAW expander-based transmitter; and
    a SAW correlator-based receiver, wherein the SAW expander-based transmitter and the SAW correlator-based receiver are located at the front end of a radio-frequency transmitter/receiver,
    wherein the SAW expander-based transmitter comprises first and second interdigital transducers (IDTs) and the SAW correlator-based receiver comprises third and fourth IDTs, the first and third IDTs configured to implement programmable coding and the second and fourth IDTs configured to implement a chirp, and outputs of the second and fourth IDTs are configured to be symmetrically chirped in opposite directions and broken into sub-bands, the sub-bands available for summing or deletion for interference or jamming mitigation.

4. The chirped SAW communication system of claim 3, wherein inputs of the first and third IDTs are phase-coded to allow multiple access coding (CDMA).

5. The chirped SAW communication system of claim 4, wherein the first and third IDTs comprise slanted fingers.

6. The chirped SAW communication system of claim 3, wherein the SAW expander-based transmitter and the SAW correlator-based receiver are operated at a harmonic frequency.

7. The chirped SAW communication system of claim 6, wherein the harmonic frequency is the third harmonic frequency.

8. A method for chirped surface acoustic wave (SAW) communication comprising:
    generating a plurality of pulse trains from a plurality of switches on a plurality of chirp expanders in response to a data signal;
    converting the plurality of pulse trains to generate at least one up ramping frequency pulse and at least one down ramping frequency pulse on a combiner;
    combining the at least one up ramping frequency pulse and the at least one down ramping frequency pulse to generate a signal on a first antenna;
    transmitting the signal from the first antenna; receiving the signal from a second antenna;
    splitting the signal from the second antenna into at least a first sub-signal and a second sub-signal;
    compressing the first and second sub-signals with a plurality of chirp correlators to generate a plurality of output signals;
    pairing the chirp expanders and the chirp correlators, wherein the chirp expanders have a first time response and the chirp correlators have a second time response, the second time response being the inverse of the first time response;
    demodulating the plurality of output signals with a plurality of demodulators; and generating commands from the demodulated output signals.

9. The method of claim 8 further comprising increasing a bandwidth of chirp SAW communication circuit by slanting a plurality of fingers of a plurality of interdigital transducers (IDTs) of the chirp expanders and the chirp correlators.

10. The method of claim 8, wherein the chirp expanders and the chirp correlators are operations at a harmonic frequency.

11. A method to process signals at a surface acoustic wave (SAW) correlator-based receiver, the method comprising:
    splitting a signal received by an antenna into a first signal and a second signal;
    pairing a first chirp correlator and second chirp correlator with a first chirp expander and second chirp expander of a SAW expander-based transmitter, respectively, wherein the first chirp correlator and the second chirp correlator are coupled to the antenna;
    compressing the first signal and the second signal using the first chirp correlator and the second chirp correlator, respectively;
    mitigating interference in the first and second signals using a plurality of adaptive starting gate blocks coupled to the first and second chirp correlators; and
    demodulating the first and second signals to produce a detected output.

\* \* \* \* \*